United States Patent
Lai

(10) Patent No.: US 7,345,717 B2
(45) Date of Patent: *Mar. 18, 2008

(54) LIQUID CRYSTAL DISPLAY DEVICE WITH A CAPACITANCE-COMPENSATED STRUCTURE

(75) Inventor: Han-Chung Lai, Taoyuan (TW)

(73) Assignee: AU Optronics Corp., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/684,148

(22) Filed: Mar. 9, 2007

(65) Prior Publication Data

US 2007/0153144 A1 Jul. 5, 2007

Related U.S. Application Data

(63) Continuation of application No. 10/807,364, filed on Mar. 23, 2004, now Pat. No. 7,250,992.

(30) Foreign Application Priority Data

Jan. 5, 2004 (TW) .............................. 93100117 A

(51) Int. Cl.
  *G02F 1/1333* (2006.01)
  *G02F 1/136* (2006.01)
  *G02F 1/1343* (2006.01)
(52) U.S. Cl. .............................. 349/54; 349/46; 349/38
(58) Field of Classification Search ................. 349/54, 349/46, 38, 39
See application file for complete search history.

(56) References Cited

U.S. PATENT DOCUMENTS

| | | | |
|---|---|---|---|
| 4,804,953 A | 2/1989 | Castleberry | |
| 4,902,638 A | 2/1990 | Muto | |
| 5,191,451 A | 3/1993 | Katayama et al. | |
| 5,285,302 A | 2/1994 | Wu | |
| 5,546,205 A | 8/1996 | Sukegawa et al. | |
| 5,808,317 A | 9/1998 | Kuo | |
| 5,877,512 A | 3/1999 | Kim | |
| 5,995,178 A * | 11/1999 | Fujikawa et al. | 349/55 |
| 6,307,216 B1 | 10/2001 | Huh et al. | |
| 6,310,668 B1 * | 10/2001 | Ukita | 349/42 |
| 6,313,889 B1 | 11/2001 | Song et al. | |
| 6,664,569 B2 | 12/2003 | Moon | |
| 6,717,634 B2 | 4/2004 | Kim et al. | |
| 7,075,595 B2 * | 7/2006 | Moon | 349/46 |
| 7,250,992 B2 * | 7/2007 | Lai | 349/54 |
| 2001/0030719 A1 | 10/2001 | Yamaguchi et al. | |
| 2003/0016310 A1 | 1/2003 | Lee | |
| 2004/0080681 A1 | 4/2004 | Moon | |

* cited by examiner

*Primary Examiner*—Mike Qi
(74) *Attorney, Agent, or Firm*—Thomas, Kayden, Horstemeyer & Risley

(57) ABSTRACT

A liquid crystal display device has a capacitance-compensated structure disposed on the side of the drain overlapping a pixel electrode. The capacitance-compensated structure can compensate the gate-drain parasitic capacitor ($C_{gd}$) when the parasitic capacitance in the overlapping region between the drain and the gate is changed.

11 Claims, 5 Drawing Sheets

LIQUID CRYSTAL DISPLAY DEVICE WITH A CAPACITANCE-COMPENSATED STRUCTURE

CROSS REFERENCE TO RELATED APPLICATIONS

This application is a Continuation of pending U.S. patent application Ser. No. 10/807,364, filed Mar. 23, 2004 and entitled "Liquid Crystal Display Device With A Capacitance-Compensated Structure".

BACKGROUND OF THE INVENTION

1. Field of the Invention

The present invention relates in general to a liquid crystal display device. More particularly, it relates to a liquid crystal display device with a capacitance-compensated structure.

2. Description of the Related Art

Due to the characteristics of thin profile, low power consumption, and lower driving voltage, liquid crystal displays (LCDs) have been widely used in flat panel displays. Owing to dielectric anisotropy and conductive anisotropy of liquid crystal molecules, molecular orientation of liquid crystals can be shifted under an external electric field, such that various optical effects are produced. Generally, the display area of a LCD comprises a plurality of pixel areas and each pixel area further comprises a pair of gate lines (scan line) and a pair of data lines to define a rectangular region. A thin film transistor (TFT), serving as a switching device, and a pixel electrode are disposed in the rectangular region.

FIG. 1 is a plane view of the conventional liquid crystal display device. In FIG. 1, the dotted line region indicates a thin film transistor T, which comprises a gate G, a source S, and a drain D. the gate G extends from a gate line 12 formed by process M1 (first metal layer). A data line 22 and the metal portions of the source S and the drain D are formed by process M2 (second metal layer). The symbol 18 indicates a channel protection layer and the symbol 24 indicates a pixel electrode. A gate-drain parasitic capacitor $C_{gd}$ is formed between the gate G and the drain D. A gate-source parasitic capacitor $C_{gs}$ is formed between the gate G and the source S. The capacitances of the gate-drain parasitic capacitor $C_{gd}$ and the gate-source parasitic capacitor $C_{gs}$ are changed when alignment shift occurs after processes M1 and M2. For example, when the second metal layer shifts towards the left side (the source S and the drain D shift toward the left side), the capacitance of the gate-drain parasitic capacitor $C_{gd}$ is increased and that of the gate-source parasitic capacitor $C_{gs}$ is reduced. Conversely, when the second metal layer shifts towards the right side (source S and drain D shift toward the right side), the capacitance of the gate-drain parasitic capacitor $C_{gd}$ is reduced and that of the gate-source parasitic capacitor $C_{gs}$ is increased.

FIG. 2 is an equivalent circuit diagram of the conventional liquid crystal display device. As shown in FIG. 2, the changed capacitance of the gate-source parasitic capacitor $C_{gs}$ does not directly affect the liquid crystal cell 36. The changed capacitance of the gate-drain parasitic capacitor $C_{gd}$, however, changes the voltage applied to the liquid crystal cell 36. This is because the gate-drain parasitic capacitor $C_{gd}$ is serially connected to the corresponding parallel circuit 36a of the liquid crystal cell 36 and the storage capacitor $C_{st}$ (not shown in FIG. 1). When the thin film transistor T is turned off, the serially connected gate-drain parasitic capacitor $C_{gd}$ reduces the voltage on the liquid crystal cell 36, inducing mura effect during operation of the liquid crystal display.

SUMMARY OF THE INVENTION

Accordingly, an object of the invention is to provide a liquid crystal display device with a capacitance-compensated structure, which can compensate the changed capacitance of the gate-drain parasitic capacitor when alignment shift occurs after M1 and M2 processes. The capacitance-compensated structure is electrically connected to the gate. One side of the drain overlaps with the gate and the other side of the drain overlaps with the capacitance-compensated structure.

Another object of the invention is to provide a liquid crystal display device with a capacitance-compensated structure, wherein a parasitic capacitor structure is disposed on the side of the drain without overlapping with the gate and is electrically connected to the gate. When the parasitic capacitance in the overlapping region between the drain and the gate is changed, the parasitic capacitor structure can compensate the changed capacitance, so as to substantially maintain the original capacitance of the gate-drain parasitic capacitor.

According the objects of the invention, a liquid crystal display device is provided. The device comprises a first process layer with a capacitance-compensated structure and a second process layer. The first process layer comprises a gate line, a gate, and a compensation structure, wherein the gate is electrically connected to the gate line and the compensation structure electrically connects to the gate. The second process layer comprises a data line, a source and a drain. The source and the drain correspond to both sides of the gate, respectively. The source is electrically connected to the data line. The data line is substantially perpendicular to the gate line. The drain has a first side overlapping the gate and a second side overlapping the compensation structure, wherein the first side is opposite to the second side. Moreover, an acceptable alignment shift range exists between the first process layer and the second process layer and the sum of the capacitance of a first parasitic capacitor between the first side of the drain and the gate and a second parasitic capacitor between the second side of the drain and the compensation structure maintains a substantially constant value within the acceptable alignment shift range.

DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

In the invention, a compensation capacitor is provided for compensating the changed capacitance of the gate-drain parasitic capacitor ($C_{gd}$) due to the alignment shift between the first metal layer (M1) and the second metal layer (M2), thereby ensuring the capacitance of the $C_{gd}$ can maintain a constant value within the acceptable alignment shift range between M1 and M2.

One side of the drain formed by process M2 overlaps with the gate formed by process M1 and the channel protection layer. Conventionally, the other side of the drain overlaps with the pixel electrode and does not overlap with any wiring formed by process M1. Moreover, a conductive plug is disposed on the overlapping region to serve as an electrical connection between the pixel electrode and the drain. In the invention, however, a compensation structure overlaps the other side of the drain. Accordingly, when alignment shift occurs after process M2, the overlapping region between one side of the drain and the gate shifts and then the overlapping region between the other side of the drain and the compensation structure also shifts for capacitance compensation. As a result, the original capacitance of the gate-drain parasitic capacitor is changed with a differential capacitance $\Delta C_1$. The overlapping region between the drain and the compensation structure produces a compensative capacitance $\Delta C_2$. Here, the modulus of $\Delta C_1$ is substantially equal to that of $\Delta C_2$. As shown in table 1, when $\Delta C_1$ is positive, $\Delta C_2$ is negative. Conversely, when $\Delta C_1$ is negative, $\Delta C_2$ is positive. That is, $\Delta C_1 + \Delta C_2 \cong 0$ or $|\Delta C_1| - |\Delta C_2| \cong 0$. Accordingly, even if alignment shift between M1 (the first metal layer) and M2 (the second metal layer) occurs, the gate-drain parasitic capacitor ($C_{gd}$) is not affected.

TABLE 1

| Overlapping region | Capacitance | |
|---|---|---|
| (between D and G) | $\Delta C_1$ | $\Delta C_2$ |
| Increase | $\Delta C_1 > 0$ | $\Delta C_2 < 0$ |
| No changing | $\Delta C_1 = 0$ | $\Delta C_2 = 0$ |
| Reduce | $\Delta C_1 < 0$ | $\Delta C_2 > 0$ |

Figure 1:
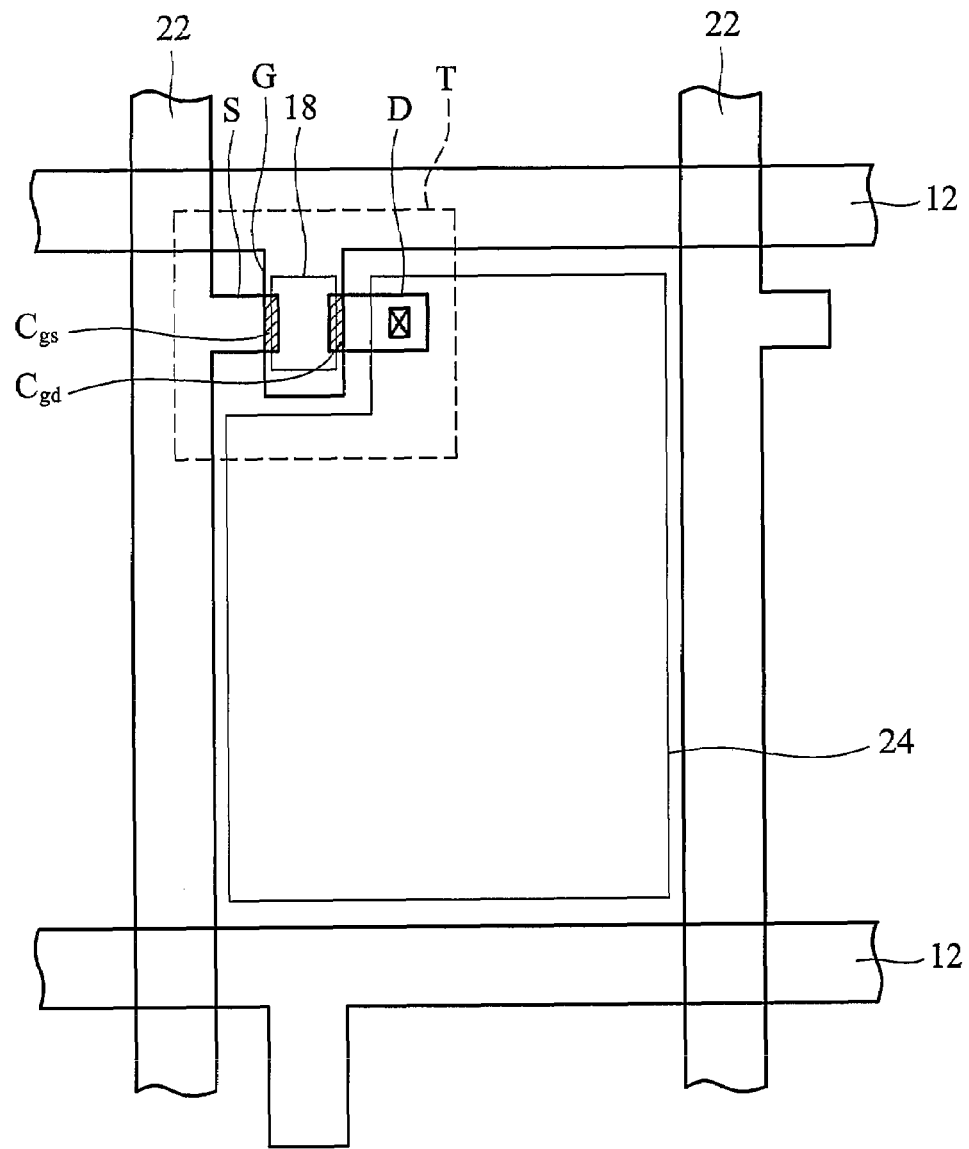
FIG. 1 is a plane view of the pixel area of the conventional liquid crystal display device.
Figure 2:
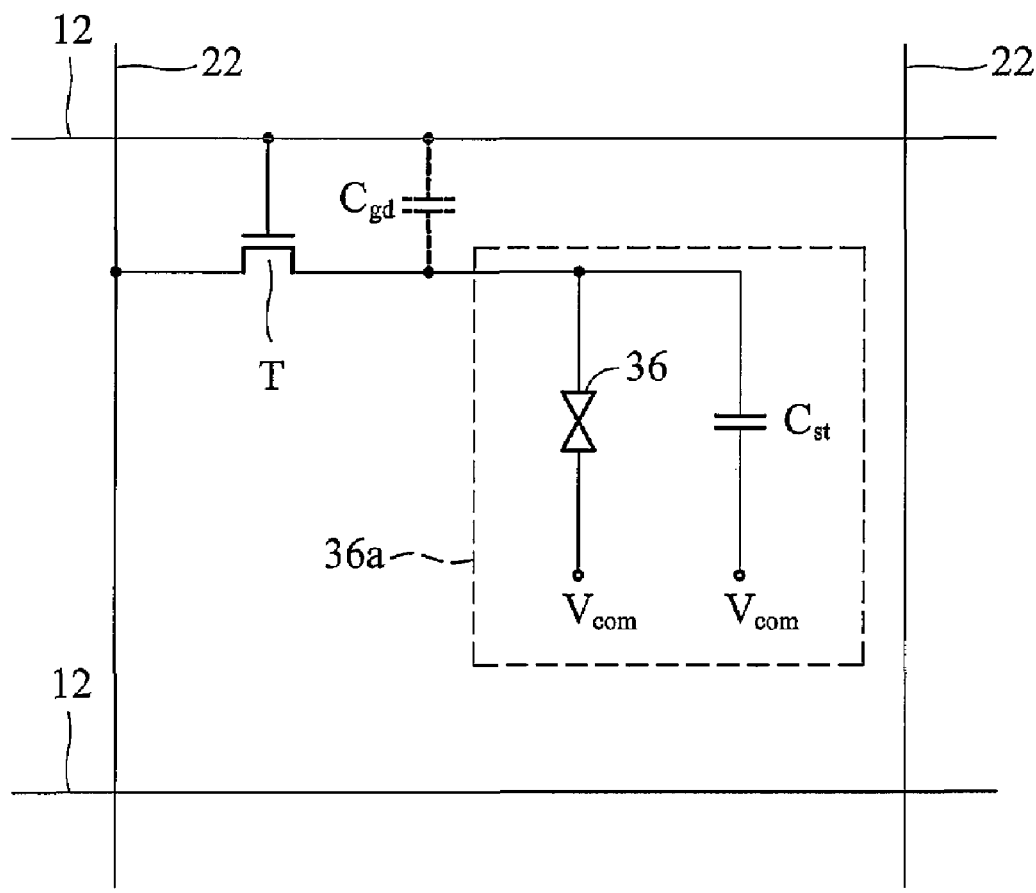
FIG. 2 is an equivalent circuit diagram of the conventional liquid crystal display device.
Figure 3A:
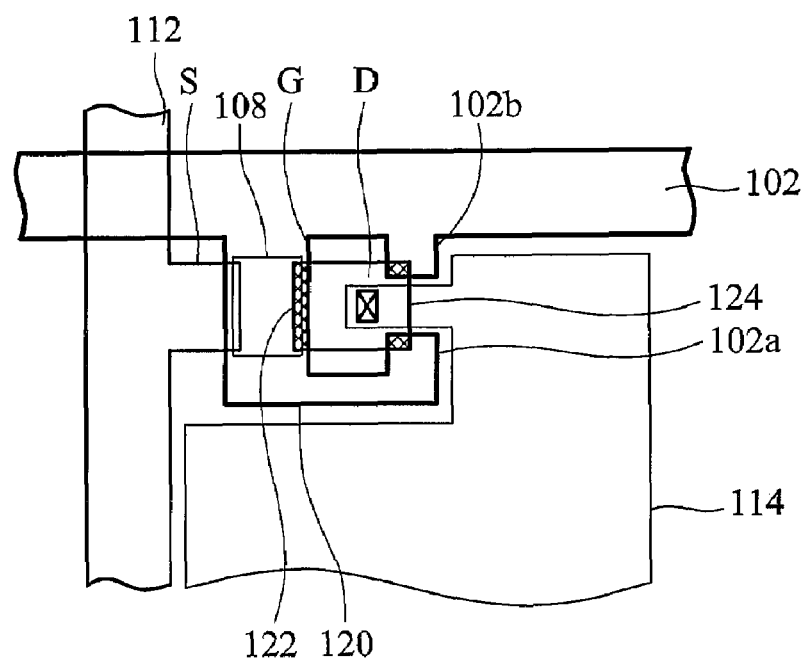
FIG. 3A is a plane view of the pixel area of a liquid crystal display device of the invention without any alignment shift between the first metal layer and the second metal layer.
Figure 3B:
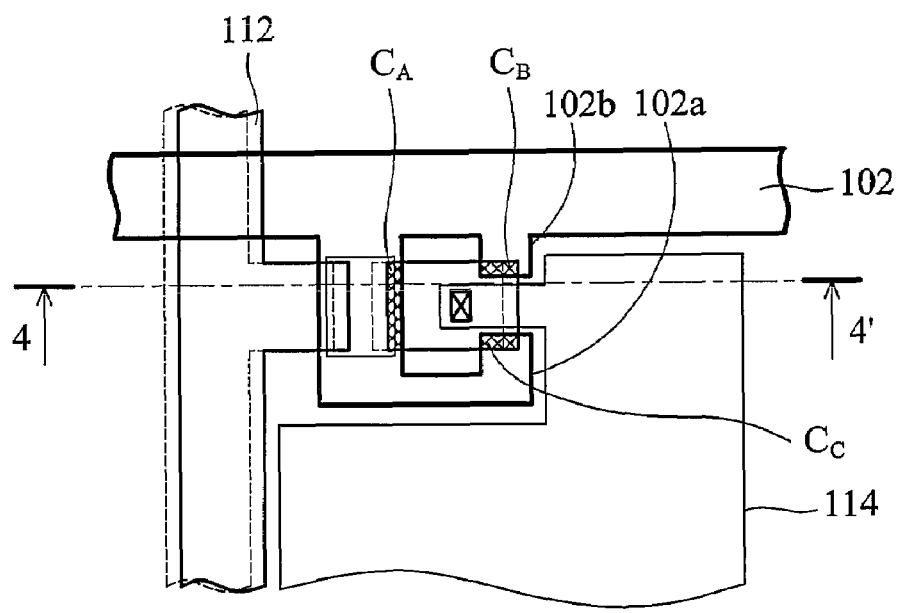
FIG. 3B is a plane view of the pixel area of a liquid crystal display device of the invention with alignment shift between the first metal layer and the second metal layer.
Figure 4:
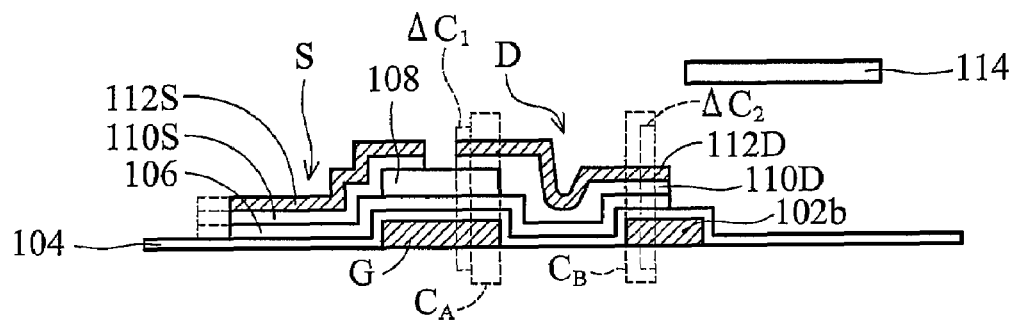
FIG. 4 is a cross-section along the line 4-4' shown in FIG. 3B.
Figure 5:
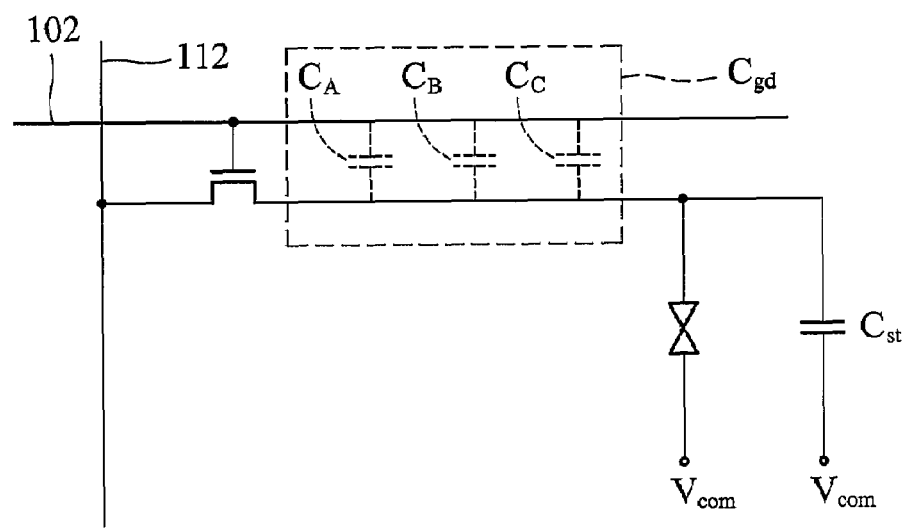
FIG. 5 is an equivalent circuit diagram of a pixel unit with a $C_{gd}$ capacitance-compensated structure according to the first embodiment of the invention.

FIGS. 3A and 3B are plane views of a $C_{gd}$ capacitance-compensated structure according to the first embodiment of the invention. FIG. 3A illustrates the case of a pixel area without alignment shift between M1 and M2. FIG. 3B additionally illustrates the case of a pixel area where alignment shift occurs between M1 and M2. Additionally, FIG. 4 is a cross-section along the line 4-4' shown in FIG. 3B. FIG. 5 is an equivalent circuit diagram corresponding to FIGS. 3A and 3B.

In the first embodiment, the compensation structure of the gate-drain parasitic capacitor ($C_{gd}$) comprises two portions 102a and 102b. The portion 102a of the compensation structure extends to the side 124 of drain D which overlaps pixel electrode 114 from the side 120 of the gate G without connecting to the gate line 102 and the portion 102a partially overlaps side 124 of drain D. The portion 102b of the compensation structure extends to the side 124 of drain D which overlaps pixel electrode 114 from the gate line 102 and the portion 102b partially overlaps side 124 of drain D. Moreover, the other side 122 of the drain D overlaps gate G.

Referring to FIGS. 3B and 4, the dotted line indicates a situation in which no alignment shift occurs between M1 and M2 and the solid line indicates a situation after alignment shift has occurred. When the capacitance of parasitic capacitor $C_A$ is changed due to alignment shift, it can be compensated by the parasitic capacitors $C_B$ and $C_C$. Here, the capacitance of the gate-drain parasitic capacitor ($C_{gd}$) is equal to the sum of the capacitance of the parasitic capacitors $C_A$, $C_B$, $C_C$ ($C_{gd} = C_A + C_B + C_C$) and $\Delta C_1 + \Delta C_2 \cong 0$. The parasitic capacitor $C_A$ may be a stacked structure comprising a gate insulating layer 104, a semiconductor layer 106, and a channel protection layer 108 or a stacked structure comprising a gate insulating layer 104 and a semiconductor layer 106. The parasitic capacitors $C_B$ and $C_C$ may comprise the gate insulating layer 104 and the semiconductor layer 106. In this embodiment, the drain D may comprise a drain electrode 112D and a drain semiconductor region 110D. Moreover, the source S may comprise a source electrode 112S and a source semiconductor region 110S. The semiconductor layer 106 is used as a channel region for a thin film transistor and may comprise an amorphous silicon layer. The source semiconductor region 110S and the drain semiconductor region 110D may comprise a doped amorphous silicon layer.

It is noted that the compensation structure 102a and 102b are necessary to compensate the capacitance of the gate-drain parasitic capacitor ($C_{gd}$) within the acceptable alignment shift range between M1 and M2.

Figure 6:
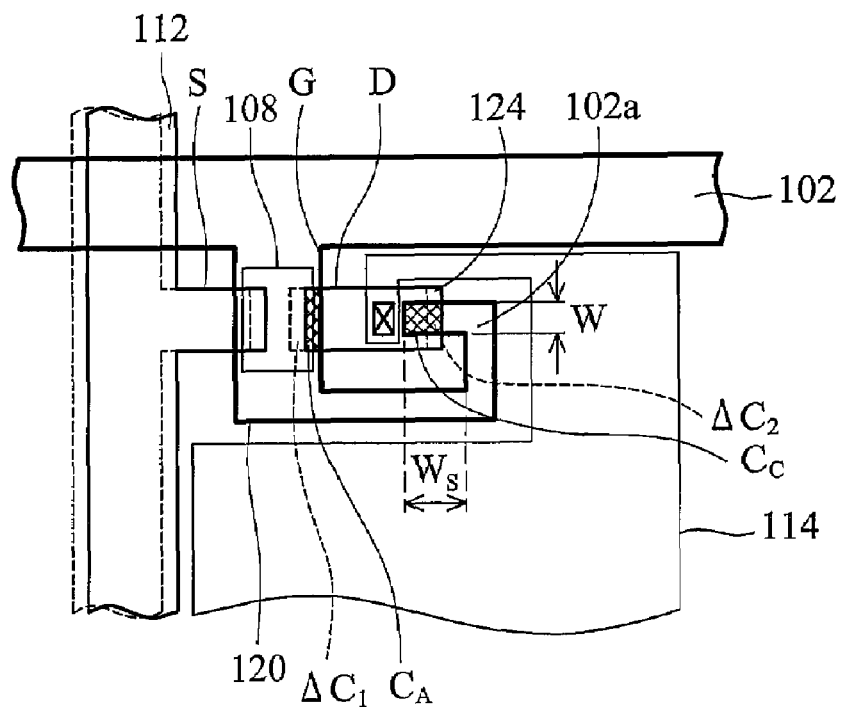
FIG. 6 is a plane view of a $C_{gd}$ capacitance-compensated structure according to the second embodiment of the invention.

FIG. 6 is a plane view of a $C_{gd}$ capacitance-compensated structure according to the second embodiment of the invention. In FIG. 6, the dotted line indicates a situation in which no alignment shift occurs between M1 and M2 and the solid line indicates a situation after alignment shift has occurred.

In the second embodiment, the compensation structure 102a for the gate-drain parasitic capacitor ($C_{gd}$) extends to the side 124 of drain D which overlaps pixel electrode 114 from the side 120 of the gate G without connecting to the gate line 102 and the compensation structure 102a partially overlaps side 124 of drain D. When the capacitance of parasitic capacitor $C_A$ is changed due to alignment shift, it can be compensated by the parasitic capacitor $C_C$. Here, the capacitance of the gate-drain parasitic capacitor ($C_{gd}$) is equal to the sum of the capacitance of the parasitic capacitors $C_A$ and $C_C$ ($C_{gd} = C_A + C_C$) and $\Delta C_1 + \Delta C_2 \cong 0$.

It is noted that two factors must be considered when designing the compensation structure 102a. One factor is the length of the compensation structure 102a depends on the acceptable alignment shift range Ws between M1 and M2. The second factor is the width W of the compensation structure 102a depends on the differential capacitance $\Delta C_1$. That is, the length of the compensation structure 102a must be long enough to overlap the drain within the acceptable alignment shift range $W_s$ between M1 and M2, thereby producing a compensative capacitance $\Delta C_2$. Moreover, the width W of the compensation structure 102a must be suitably adjustable to ensure that the modulus of $\Delta C_2$ is substantially equal to that of $\Delta C_1$ ($\Delta C_1 + \Delta C_2 \cong 0$ or $|\Delta C_1| - |\Delta C_2| \cong 0$).

Figure 7:
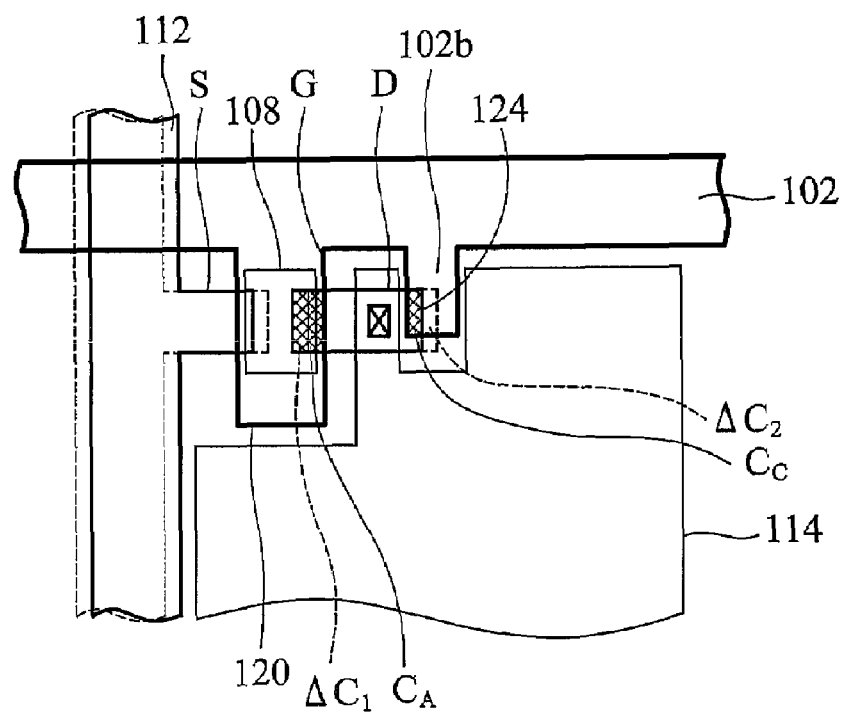
FIG. 7 is a plane view of a $C_{gd}$ capacitance-compensated structure according to the third embodiment of the invention.

FIG. 7 is a plane view of a $C_{gd}$ capacitance-compensated structure according to the third embodiment of the invention. In FIG. 7, the dotted line indicates a situation in which no alignment shift between M1 and M2 and the solid line indicates a situation after alignment shift has occurred.

In the third embodiment, the compensation structure 102b for the gate-drain parasitic capacitor ($C_{gd}$) extends to side 124 of drain D which overlaps pixel electrode 114 from the gate line 102 and the compensation structure 102b partially overlaps side 124 of drain D. When the capacitance of parasitic capacitor $C_A$ is changed due to alignment shift, it can be compensated by the parasitic capacitor $C_B$. Here, the capacitance of the gate-drain parasitic capacitor ($C_{gd}$) is equal to the sum of the capacitance of the parasitic capacitors $C_A$ and $C_B$ ($C_{gd}=C_A+C_B$) and $\Delta C_1+\Delta C_2 \cong 0$.

According to the invention, both sides of the drain respectively overlap with the gate and the compensation structure, thereby compensating change of the capacitance of the gate-drain parasitic capacitor due to alignment shift between M1 and M2. Moreover, a parasitic capacitor is formed between one side of the drain and the gate and an additional parasitic capacitor is formed on the other side of the drain to connect to the gate. When the capacitance of the parasitic capacitor formed in the overlapping region between the drain and the gate is changed, it can be compensated by the additional parasitic capacitor formed on the other side of the drain. As a result, the capacitance of the gate-drain parasitic capacitor can be maintained without changing. Accordingly, the liquid crystal display device of the invention can prevent the capacitance of the gate-drain parasitic capacitor form changed due to alignment shift between M1 and M2, thereby increasing yield.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A pixel region of a display device, comprising:
   a gate line;
   a gate electrically connected to the gate line;
   a compensation structure electrically connected to at least one of the gate and the gate line;
   a drain comprising a first portion overlapped the gate to form a first parasitic capacitor and a second portion overlapped a portion of the compensation structure to form a second parasitic capacitor, such that the modulus of a differential capacitance of the first parasitic capacitor between the drain and the gate in alignment shift is substantially equal to the modulus of a compensative capacitance of the second parasitic capacitor in the alignment shift; and
   a pixel electrode electrically connected to the drain through a via, and so that a portion of the pixel electrode is substantially located between the gate and the compensation structure and substantially spaced apart from at least one of the gate and the compensation structure.

2. The pixel region of claim 1, wherein the compensation structure is electrically connected to the gate and the gate line, and the second parasitic capacitor comprises a first sub-parasitic capacitor at an overlap region between the second portion of the drain and the compensation structure electrically connected to the gate and a second sub-parasitic capacitor at an overlap region between the second portion of the drain and the compensation structure electrically connected to the gate line.

3. The pixel region of claim 2, wherein at least one of the first parasitic capacitor, the first sub-parasitic capacitor and the second sub-parasitic capacitor comprises a stacked structure having at least one of a gate insulating layer, a semiconductor layer, and a channel protection layer.

4. The pixel region of claim 1, wherein the compensation structure extends from at least one of the gate line and the gate.

5. The pixel region of claim 1, wherein the first portion of the drain substantially opposites to the second portion of the drain.

6. The pixel region of claim 1, wherein the portion of the pixel electrode comprises an extension portion from thereof.

7. A pixel region of a display device, comprising:
   a gate line;
   a gate electrically connected to the gate line;
   a compensation structure electrically connected to at least one of the gate and the gate line;
   a drain comprising a first portion overlapped the gate to form a first parasitic capacitor and a second portion overlapped a portion of the compensation structure to form a second parasitic capacitor, such that the modulus of a differential capacitance of the first parasitic capacitor between the drain and the gate in alignment shift is substantially equal to the modulus of a compensative capacitance of the second parasitic capacitor in the alignment shift; and
   a pixel electrode electrically connected to the drain through a via, and so that a portion of the pixel electrode is substantially located between the gate and the compensation structure;
   wherein the compensation structure is electrically connected to the gate and the gate line, and the second parasitic capacitor comprises a first sub-parasitic capacitor at an overlap region between the second portion of the drain and the compensation structure electrically connected to the gate and a second sub-parasitic capacitor at an overlap region between the second portion of the drain and the compensation structure electrically connected to the gate line.

8. The pixel region of claim 7, wherein at least one of the first parasitic capacitor, the first sub-parasitic capacitor and the second sub-parasitic capacitor comprises a stacked structure having at least one of a gate insulating layer, a semiconductor layer, and a channel protection layer.

9. The pixel region of claim 7, wherein the compensation structure extends from at least one of the gate line and the gate.

10. The pixel region of claim 7, wherein the first portion of the drain substantially opposites to the second portion of the drain.

11. The pixel region of claim 7, wherein the portion of the pixel electrode comprises an extension portion from thereof.

* * * * *